United States Patent [19]

Kaplan

[11] Patent Number: 5,734,371

[45] Date of Patent: Mar. 31, 1998

[54] INTERACTIVE POINTING DEVICE

[75] Inventor: Alan Edward Kaplan, Morristown, N.J.

[73] Assignee: Lucent Technologies Inc., Murray Hill, N.J.

[21] Appl. No.: 771,887

[22] Filed: Dec. 23, 1996

Related U.S. Application Data

[63] Continuation of Ser. No. 358,445, Dec. 19, 1994, abandoned.

[51] Int. Cl.⁶ .......................................................... G09G 5/08
[52] U.S. Cl. ........................................... 345/158; 345/157
[58] Field of Search ................................... 345/156, 157, 345/158, 169, 7, 8; 348/734; 340/825.72; 128/782

[56] References Cited

U.S. PATENT DOCUMENTS

| | | |
|---|---|---|
| 5,161,311 | 11/1992 | Esmer et al. . |
| 5,201,128 | 4/1993 | Olivier et al. . |
| 5,221,088 | 6/1993 | McTeigue et al. . |
| 5,311,203 | 5/1994 | Norton . |
| 5,339,095 | 8/1994 | Redford ................................. 345/169 |
| 5,363,120 | 11/1994 | Drumm ................................. 345/158 |
| 5,373,857 | 12/1994 | Travers et al. . |

*Primary Examiner*—Regina Liang
*Attorney, Agent, or Firm*—Steven R. Bartholomew; Robert P. Marley

[57] ABSTRACT

An interactive video/computer pointing system utilizing a magnetic sensor to derive relative azimuthal information, and an inclinometer or accelerometer to provide relative angular elevation information. The azimuthal information is processed to yield an indication of any horizontal movement of the pointing device, and the angular elevation is processed to yield an indication of any vertical movement of the pointing device. This horizontal and vertical movement information is utilized to responsively control a video cursor, thereby enabling the user to point to and select various regions upon a video screen by manipulating the pointing device.

4 Claims, 1 Drawing Sheet

INTERACTIVE POINTING DEVICE

This application is a continuation of application Ser. No. 08/358,445, filed on Dec. 19, 1994, now abandoned.

TECHNICAL FIELD

The invention relates to interactive video and computer systems and, more particularly, to pointing devices for use in conjunction with such systems.

BACKGROUND OF THE INVENTION

With the advent of increasingly interactive video services being provided by television cable services, and the expected proliferation of such services as the number of channels being provided to cable subscribers is increased, providing a simple user interface has become essential. Some of the most common such interfaces are pointing devices that allow a subscriber to obtain a service or perform an action by pointing to a particular region of an image on a television screen. For example, a subscriber presented with a video image of a menu of pay-per-view television programs would select a desired program by directing a pointing device at the region of the television screen associated with that desired program. In response to this pointing, the cable television provider receives feedback (either directly from the pointing device, the television, or some other adjunct unit linked to the pointing device), and the selected program is routed to the subscriber's television. Similar systems have been demonstrated in which subscribers employed pointers to select and purchase merchandise from an interactive television shopping service.

Previous interactive video pointers have included conventional computer mouse devices, touch-sensitive pads, joysticks, arrays of push-buttons, as well as hand-held remote control units that communicated information to a receiver via infrared signals. In all cases, the pointing device/television combination must provide the user with a visual indication of the area of the television screen being pointed to, and enable the generation of feedback to the interactive service provider in response to the selection of a particular screen area by the user.

SUMMARY OF THE INVENTION

The present invention provides an interactive video/computer pointing system utilizing a magnetic sensor to derive relative azimuthal information, and an inclinometer or accelerometer to provide relative angular elevation information. The azimuthal information is processed to yield an indication of any horizontal movement of the pointing device, and the angular elevation is processed to yield an indication of any vertical movement of the pointing device. A gimballed magnetic sensor detects the horizontal position of the pointing device relative to an initial reference position in an external magnetic field and, in response to the horizontal position of the pointing device, generates a horizontal position indication signal. This horizontal and vertical movement information is utilized to responsively control a video cursor, thereby enabling the user to point to and select various regions upon a video screen by manipulating the pointing device.

DETAILED DESCRIPTION OF THE INVENTION

Figure 1:
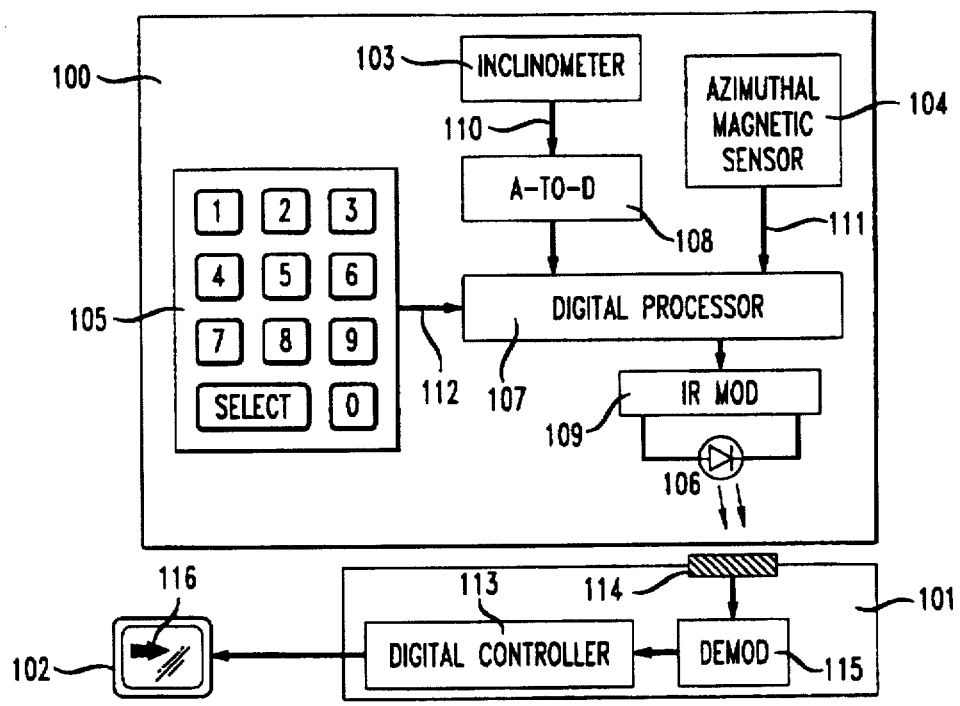
FIG. 1 is a simplified block diagram of an interactive video system that includes an embodiment of the invention.

FIG. 1 shows a simplified block diagram of an interactive video system that includes an embodiment of the invention. The illustrated video system includes pointing device 100, interface 101, and video monitor 102.

As shown, pointing device 100 includes inclinometer 103, azimuthal magnetic sensor 104, keypad 105, infrared light-emitting diode ("LED") 106, digital processor 107, analog-to-digital ("A-to-D") convertor 108, and infrared LED modulator 109. Inclinometer 103 is rigidly mounted within pointing device 100 so that it is oriented to sense the degree if vertical tilt at which the pointing device is situated, and provide an analog voltage upon line 110 that is proportional to the sensed tilt. Such inclinometers are available commercially—For example, the SSY0090/SSY0091 Inclinometer, which is manufactured by Spectron Systems Technology, Inc. of Hauppauge, N.Y. The analog voltage evident upon line 110 is converted to digital information by A-to-D convertor 108, and this information is then passed digital processor 107. Azimuthal magnetic sensor 104 is also rigidly mounted within pointing device 100, but oriented so that it senses the relative angular horizontal position of pointing device 100 with respect to an external magnetic field, and produces a digital signal, indicative of this sensed position, upon line 111. In this particular embodiment azimuthal magnetic sensor 104 is an electronic compass that employs a solid-state flux sensor to accurately determine orientation with respect to the earth's magnetic field. This gimballed magnetic sensor detects the horizontal position of the pointing device relative to an initial reference position in an external magnetic field and, in response to the horizontal position of the pointing device, generates a horizontal position indication signal. Electronic compasses capable of performing this type of sensing are readily available; an example of one such device is the C100 Compass Engine manufactured by KVH Industries, Inc. of Middletown, R.I. As shown, the digital signal produced by azimuthal magnetic sensor 104 is passed to digital processor 107. Keypad 105, which is mounted on the face of pointing device 100, is an ordinary array of eleven normally-open switches that may be closed by manually depressing an associated key (labeled with the symbols 0 through 9, and the word "SELECT"). Information indicative of state of these switches is passed to digital processor 107 via line 112. Infrared LED 106 is connected to digital processor 107 via LED modulator 109. In response to a specific program stored within digital processor 107, and the information received from inclinometer 103, azimuthal magnetic sensor 104, and keypad 105, digital processor 107 modulates the optical output of infrared LED 106. The modulation of infrared LEDs in response to signals produced by digital processors is well known in the art, and commonly employed in most hand-held television remote control units. LED modulators that facilitate such are commercially available, and an example of one such modulator is the SA 1250 Infrared Remote-Control Transmitter manufactured by ITT Components of Irvine, Calif.

Interface 101 includes digital controller 113, infrared photodetector 114 and demodulator 115. Signals received via infrared photodetector 114 are demodulated by demodulator 115 and passed to digital controller 113. In response, digital controller 113 controls the position and function of cursor 116 upon video monitor 102. The use of a digital controller to responsively position an on-screen video cursor is common place in computer systems (i.e., mouse-based computer interfaces, computer-aided drafting systems, etc.), and the application of such cursor control in video/television environments is also well known (i.e., on-screen video tape recorder programming menus, interactive television systems). Demodulators adapted to facilitate such are commercially available, and an example of one such demodulator is the SA 1251 Infrared Remote-Control Receiver manufactured by ITT Components of Irvine, Calif.

To operate the system of FIG. 1, a user holds pointing device 100 so that an optical signal produced by infrared LED 106 may be received by infrared photodetector 114, and depresses the key labeled "SELECT" to close the associated switch. In response to the "SELECT" being closed, digital processor 107 begins to periodically calculate (on the order of ten times per second) the tilt and relative horizontal position of pointing device 100 based upon the signals received from inclinometer 103 (via A-to-D convertor 108) and azimuthal magnetic sensor 104. As each calculation of tilt and horizontal position information is completed, digital processor 107 instructs LED modulator 109 to modulate infrared LED 106 and thereby produce a digitally encoded optical signal indicative of the calculated positional information. Consequently, approximately every tenth of a second infrared photodetector 114 receives an optical signal from infrared LED 106 indicative of the current relative orientation of pointing device 100. These optical signals are converted to electrical signals by infrared photodetector 114, demodulated by demodulator 115, and passed to digital controller 113. The information passed from digital processor 107 to digital controller 113 via these optical signals can be indicative of the actual position of pointing device 100, or an merely indicate the change in the position of pointing device 100 since the last positional information was calculated and transmitted. Production and transmission of these periodic optical signals continues as long as the user continues to depress the "SELECT" key. In response to periodic positional information, digital controller 113 causes cursor 116 to be proportionately translated across video screen 102. Cursor 116 is similar to the type of on-screen cursors that are typically controlled by computer and/or video pointing devices (i.e., mouse devices, touch-sensitive pads, joysticks). Such cursors are commonly manipulated through a user interface to point to and select various regions upon a display screen, and their use and generation is well known.

Upon the release of the "SELECT" key by the user, processor 107 ceases the periodic calculation of positional information for pointing device 100, and the modulation of LED 106 terminates. Consequently, photodetector 114 and digital controller 113 fail to receive any additional positional information. Responding to this cessation of incoming information, digital controller 113 stops the translation of cursor 116 across screen 102. In this manner, a user manipulating pointing device 100 may direct cursor 116 to any region of screen 102, thereby selecting a particular menu item, positioning a particular on-screen image, or performing any other function associated with the maneuvering of a video/computer cursor.

Figure 2:
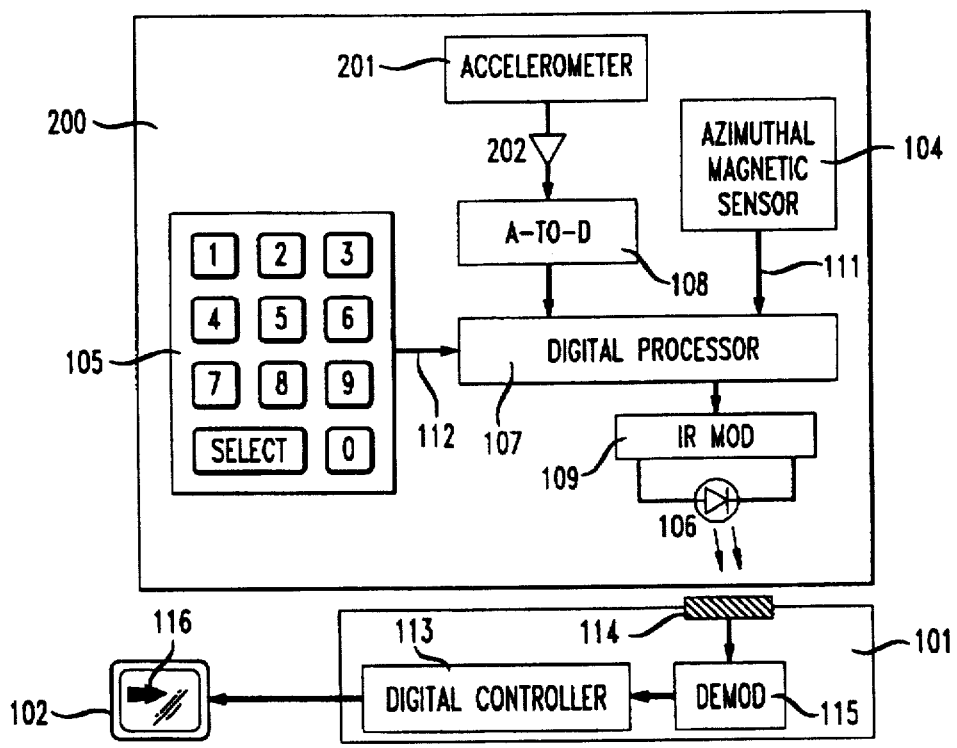
FIG. 2 is a simplified block diagram of an interactive video system that includes an alternate embodiment of the invention.

FIG. 2 shows a simplified block diagram of an interactive video system that includes an alternate embodiment of the invention. This video system is similar in configuration and function to the system of FIG. 1 (the various components in FIG. 2 perform the same function as their like-numbered counterparts in FIG. 1). However pointing device 200 differs from the pointing device of FIG. 1 in that the function of sensing the degree if vertical tilt at which pointing device 200 is situated is performed by accelerometer 201 (as opposed to inclinometer 103 for pointing device 100 of FIG. 1). Accelerometer 201 is rigidly mounted within pointing device 200 so that as the pointing device is tilted with respect to the horizontal plane, the component of acceleration due to gravity measured by accelerometer 201 varies proportionally with the sine of the angle of inclination. As a result, accelerometer 201 functions to provide a differential analog voltage that is proportional to the sine of this sensed inclination. Many commercially available micro-machined silicon accelerometers would be suitable to perform this function. One such device is the Model 3021 General Purpose Piezoelectric Accelerometer manufactured by IC Sensors of Milpitas, Calif. The differential analog voltage produced by accelerometer 201 is amplified by instrumentation amp 202 and fed to A-to-D convertor 108. The amplified signal is converted to digital information by A-to-D convertor 108, and this information is then passed digital processor 107. As with the pointing device of FIG. 1, azimuthal information is provided to digital processor 107 from magnetic sensor 104, and positional information for pointing device 200 is calculated. Likewise, this information is then transmitted, received and employed to manipulate an on-screen cursor in a manner like that described for the system of FIG. 1.

It will be understood that the particular techniques described above are only illustrative of the principles of the present invention, and that various modifications could be made by those skilled in the art without departing from the scope and spirit of the present invention, which is limited only by the claims that follow. Such modifications would include employing other common sensing devices to detect the relative inclination and/or relative horizontal position of a pointing device used to practice the invention (for example, the use of a mercury filled sensor to detect relative inclination). Another modification would include utilizing a pointing device that produces a cursor initiation signal in response to a key being depressed and released, and then produces and transmits periodic positional information until that same key or another is depressed. Yet another modification would include providing the user of the system with a means of varying the sensitivity of the pointing device (i.e., how far the on-screen cursor is translated in response to a given motion of the pointing device). This sensitivity could be varied by simply instructing the digital processor within the pointing device and/or the digital controller within the interface to respond in an exaggerated or diminished manner to positional signals. Such instructions would be entered via the keypad upon the pointing device. In addition, it will be understood that the invention could also be applied to systems wherein information is transmitted from the pointing device to the digital controller via electrical signals over wire or via optical signals over fiber. In the case of electrical signals, this would obviate the need for an infrared LED and infrared photodetector within the system, as electrical signals could be sent directly from the digital processor to the digital controller.

I claim:

1. A pointing device comprising:
   (a) a gimballed magnetic sensor for detecting the horizontal position of the pointing device relative to an initial reference position in the earth's magnetic field and, in response to the horizontal position of the pointing device, generating a horizontal position indication signal;
   (b) an inclination sensor for detecting the relative vertical position of the pointing device relative to the initial reference position and, in response to the vertical position of the pointing device, and not in response to the earth's magnetic field, generating a vertical position indication signal; and (c) a processor, responsive to the horizontal and vertical position indication signals, for generating a position signal indicative of the horizontal and vertical positions of the pointing device relative to the initial reference position.

2. The pointing device of claim 1 further comprising a display device, coupled to the processor, for displaying a visual indication of the position signal generated by the processor.

3. A pointing device as set forth in claim 2 wherein the display device includes an initial display position corresponding to the initial reference position.

4. A pointing device as set forth in claim 3 wherein, upon initial activation, the processor processes the position signal such that the visual indication of the position signal appears substantially at a specified location on the display device, this specified location corresponding to the initial reference position of the pointing device.

* * * * *